May 26, 1964  A. A. MATTHIES  3,134,238
DEFROST CONTROL RESPONSIVE TO FROST ACCUMULATION
Filed Aug. 31, 1960  3 Sheets-Sheet 1

INVENTOR.
ALAN ARTHUR MATTHIES
BY
*Bayard H. Michael*
ATTORNEY

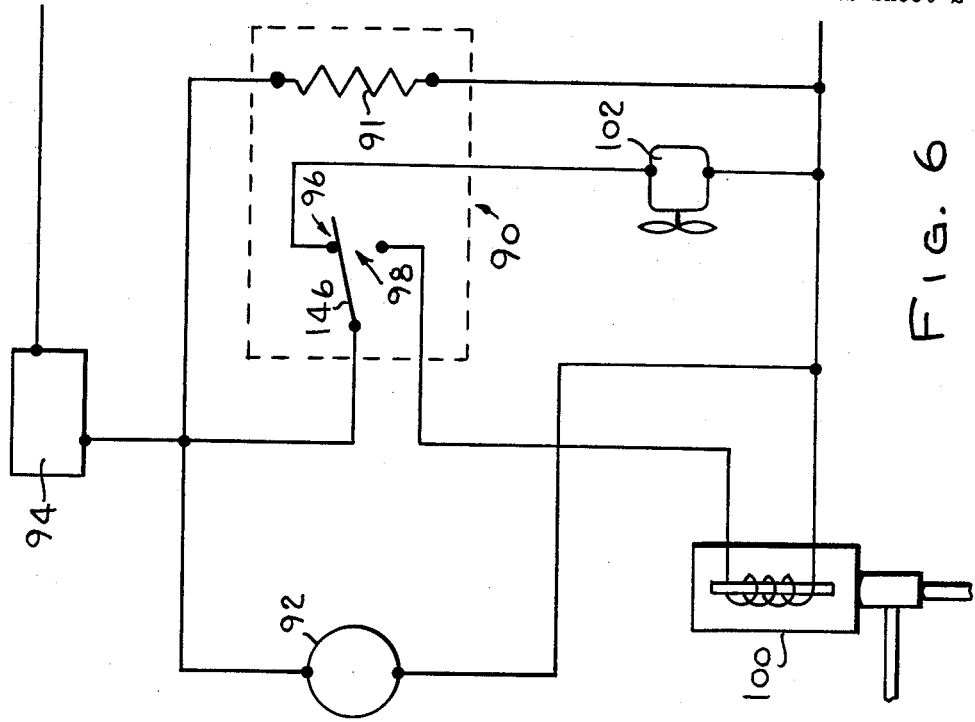
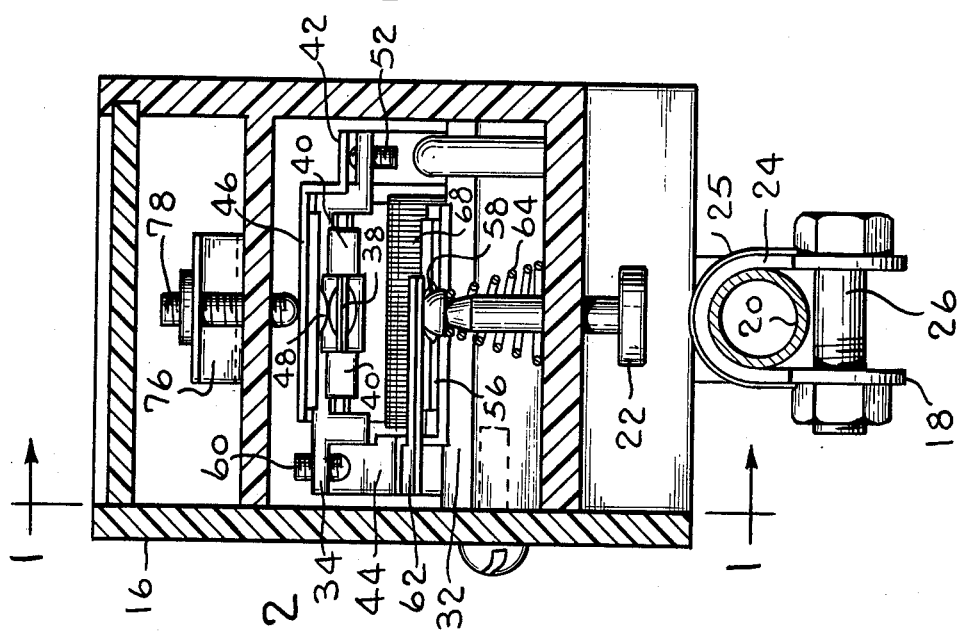

May 26, 1964     A. A. MATTHIES     3,134,238
DEFROST CONTROL RESPONSIVE TO FROST ACCUMULATION
Filed Aug. 31, 1960     3 Sheets-Sheet 3

INVENTOR.
ALAN ARTHUR MATTHIES
BY
ATTORNEY

United States Patent Office 3,134,238
Patented May 26, 1964

3,134,238
DEFROST CONTROL RESPONSIVE TO FROST ACCUMULATION
Alan Arthur Matthies, Milwaukee, Wis., assignor to Controls Company of America, Schiller Park, Ill., a corporation of Delaware
Filed Aug. 31, 1960, Ser. No. 53,172
16 Claims. (Cl. 62—140)

This invention relates to refrigeration controls, and particularly, to an improved device for sensing and controlling the accumulation of frost on the evaporation coils of refrigerating systems.

My co-pending application Serial No. 1,316, filed January 8, 1960, now Patent No. 3,033,004, discloses a self-cycling type frost sensor which periodically senses the coil of the refrigerating system to determine the presence of excessive accumulations of frost on the coils. It has been found that where the temperature ranges vary considerably, the bimetal has a tendency to overtravel, which causes the bimetal to become distorted and prematurely actuate the switches thereby stopping defrost action before the frost has been completely melted from the coils.

The primary object of this invention is to provide an improved defrost control which is not affected by wide ambient temperature ranges.

Another object of the present invention is to provide an improved defrost control which is automatically compensated to prevent premature actuation of the switches.

As disclosed in the aforementioned application, a control bimetal is used to move a sensing member into and out of engagement with a coil in the refrigerating system by intermittently heating the control bimetal. During the heating portion of the cycle, the sensing member is moved into engagement with the coil, and if the sensing member engages an accumulation of frost on the coil, defrost action is initiated. If, however, no frost is sensed on the coil, the heater is de-energized and the bimetal returns to the starting position. In the prior sensor, the control functions are regulated by a number of switches mounted on the free end of the bimetal. During the heating portion of the cycle, the bimetal heater switch was held closed by the force of a magnet carried on the bimetal and if the sensing member did not engage any frost, the heater switch was opened de-energizing the heater and allowing the bimetal to return to its starting position. If the sensing member engaged a predetermined accumulation of frost on the coils, a defrost switch was closed by the motion of the bimetal and the heater switch was simultaneously opened initiating defrost action and de-energizing the heater so that the bimetal returned to its starting position. Defrost action continued until the refrigerator ambient was high enough to have melted the frost accumulated on the coils in the refrigerator. As the ambient temperature went up, there was a tendency for the bimetal to fulcrum on the return stop member, causing premature actuation of the function switches. I have overcome this tendency in two ways. In the first, I have placed a compensating bimetal in position to block the return motion of the control bimetal and to sense the same ambient. The two bimetals are positioned to come into contact at the upper limit of the control and are designed to exert equal and opposite forces at the upper position. When the control bimetal starts to pivot on the upper stop, the compensating bimetal will apply an opposing force over large areas on the control bimetal preventing any further upward movement.

In the second, I have mounted the function switches on a leaf spring which is biased against the upper limit stop. A bimetal is wrapped around the outer surface of the leaf spring so that the motion of the bimetal when heated will move the spring in a sensing direction as above. On the return motion of the bimetal, the spring will stop upon engaging the upper limit stop and the bimetal will be free to move outward from the spring as the ambient continues to rise. Since the spring is not affected by the ambient temperature, there will be no tendency to cause premature actuation of the switches.

In the self-cycling systems as described above, the sensing member is continuously moved into and out of engagement with the coil, either during the operation of the compressor, or independently of the operation of the compressor. In the self-cycling arrangement, defrost action can occur too frequently, particularly during a long refrigeraing operation, due to the build-up of frost resulting from a relatively large temperature drop. Another objection to the previous system was the continued operation of the refrigerating fan during a defrost action, circulating the warm air away from the coils prolonging defrost operation and raising the refrigerator temperature unnecessarily.

A further object of this invention is to coordinate the operation of the defrost control with the operation of the compressor.

A still further object of the present invention is to provide a defrost control for a refrigerating system which de-energizes the refrigerator fan during defrosting operation.

This is accomplished by connecting the heater for the defrost control in parallel with the refrigerator compressor and positioning the control bimetal or spring so that the sensing member engages the coil when the compressor is shut down. The function switches of the defrost control are connected to the refrigerator fan and a defrost device so that either the fan or the defrost device will be shut down while the other is operating. When the compressor is turned on, the bimetal heater will be energized, causing the bimetal or spring to move away from the coil and holding the sensing member away from the coil during the operation of the compressor. The refrigerator fan switch will be normally closed so that the air around the coils will be circulated during compressor operation. When the compressor is shut down, the bimetal heater will be de-energized, causing the control bimetal to move the sensing member into engagement with the coil. If there has been a sufficient buildup of frost during the operation of the compressor, the defrost switch will be closed and the fan switch opened. When the compressor is again turned on, defrost action will be initiated and the refrigerator fan will be turned off preventing the circulation of the hot air during defrost operation. Defrost action will be stopped when the refrigerator ambient has reached a predetermined level by closing the refrigerator fan switch which simultaneously opens the defrost switch.

Other objects and advantages will be pointed out in, or be apparent from, the specification and claims, as will obvious modifications of the embodiments shown in the drawings, in which:

FIG. 2 is taken on line 2—2 of FIG. 1.

FIG. 6 shows the circuit for a modified system for sensing only during the refrigerating "off" cycle.

Figure 5:
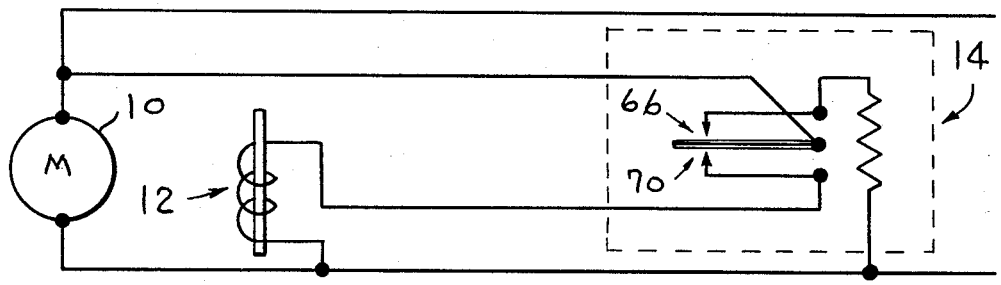
FIG. 5 shows the circuit for a self-cycling refrigerating system.

As seen in FIG. 5, the refrigerating system contemplated herein includes compressor motor 10, solenoid actuated defrost device 12, such as a shut-off switch or reversing valve, and frost sensor 14. The housing 16 of the frost sensor is mounted on bracket 18, which is clamped on coil 20 of the refrigerating system. To maintain an accurate distance for the movement of sensing member 22, end 24 of the bracket is used as a frost accumulating surface. Screen 25 may be mounted on the frost accumulating surface to dissipate any moisture which may accumulate thereon during a defrost action. The bracket is clamped tightly to the coil by bolts 26, so that the same temperature conditions will exist on the bracket as are encountered on the coil. Two U-shaped bimetals 28 and 30 are secured to the bottom of the housing by support 32, with bridge 34 mounted upon the free end of bimetal 30. A flexible member 36 is attached at one end to the bridge and supports double contact 38 and magnet 40 at its free end. A pair of U-shaped leaf springs 42, 44 are secured to the housing by support 32 and to the bimetal by bridge 34 and extend beyond the end of the bridge. Permeable member 46 and contact 48 are secured to the end of spring 42, forming heater switch armature 50, which is positioned to engage the magnet and double contact. Spring 42 is bent upward from the bridge by set screw 52 to bias the heater switch armature away from the magnet and double contact. Spring 44 has defrost switch armature 54, mounted on its free end and includes permeable member 56 and contact 58, positioned to engage the opposite side of magnet 40 and double contact 38 and is bent downward from the bridge by set screw 60, so that the defrost switch armature is biased away from the magnet and double contact. A flat leaf spring 62 is secured to the bridge and underlies spring 44 to engage sensing plunger 22 providing added stiffness to spring 44 to overcome the bias of spring 64 on the sensing plunger so that the downward motion of the bimetal will move the plunger into engagement with the coil.

The heater switch armature and the double contact form heater switch 66, which is connected in series with bimetal heater 68 mounted on support 32 adjacent to the bimetal. The defrost switch armature and the double contact form defrost switch 70 which is connected in series with defrost control 12. When the heater switch is closed, the flux density of magnet 40 will hold the switch armature against the double contact. The heater will then be energized, causing the bimetal 30 to move downward, moving the plunger toward the coil. Bimetal 28 will warp outward from bimetal 30, since it is designed to move in the opposite direction from bimetal 30. If the sensing plunger contacts surface 24 without engaging a predetermined thickness of frost, the end of spring 42 will engage adjustable post 72, preventing further downward motion of the heater switch armature. The bimetal will continue to move the double contact downward until the heater switch armature is released from the field of the magnet, thereby allowing the bias of spring 42 to open the heater switch de-energizing the heater. Bimetal 30 will move away from the coil as it cools, and the sensing plunger will follow the bimetal due to the bias of spring 64. When bimetal 30 approaches the upper limit of its movement away from the coil, the heater switch armature will abut the top of the housing, and bimetal 28 will have moved into contact with bimetal 30, preventing further upward movement of the double contact. Since defrost action has not been initiated, the flux density of the magnet will be sufficient to draw the heater switch armature downward into contact with the double contact to start another sensing cycle.

If the sensing plunger during the downward motion of bimetal 30 engages a predetermined thickness of frost on surface 24, it will stop and flat spring 62 will prevent further downward movement of spring 42 and the defroster switch armature. Bimetal 30 will continue to move until the double contact and magnet engage the defroster switch armature, closing the defroster switch and actuating the defroster solenoid 12. Simultaneous with the initiation of defrost action, the heater will be de-energized by opening the heater switch. This is accomplished by providing the magnet with sufficient flux density to hold only one switch armature at a time against the bias provided by the leaf springs. When the magnet is brought into contact with the defrost switch armature, the flux density of the magnet will be divided between the two permeable portions of the switch armatures. The bias of leaf spring 42 is set so that it will overcome the forces of the magnet when the flux density of the magnet is divided between the armatures, snapping the heater switch open. The defrost switch armature being held from movement by flat spring 62, will be held against the magnet and the full magnetic force of the magnet will then hold the defrost switch closed. As the bimetal 30 cools and starts to move away from the coil, the flexible member 36 will bend slightly downward because the defroster switch is closed, and the bias of spring 44 is strong enough to hold the flexible member and double contact bent slightly downward. When bimetal 30 reaches the upper limit of its travel, bimetal 28 will have moved to a position opposite bimetal 30 to oppose any further movement of bimetal 30. Since the magnet is mounted on the flexible member, it will not be close enough to attract the heater switch armature, because it is pulled downward by the bias of spring 44 supporting the defrost switch armature. Defrost action will continue indefinitely since the magnet does not have sufficient flux density to attract the heater switch armature. Termination bimetal 76 is positioned on the housing to respond to the ambient temperature within the refrigerating space. When the temperature rises sufficiently within the space to melt the frost which has been sensed on the coil, the termination bimetal will warp downward until pin 78 moving through aperture 80 in the housing engages spring 42, pushing the heater switch armature downward until it contacts the double contact. Spring 44 will snap the defroster switch open due to the division of the flux density of the magnet between the two armatures, stopping defrost action and starting another sensing cycle.

It can be seen that the upward motion of the bimetal is stopped by bimetal 28 holding the double contact from further upward movement. If bimetal 30, due to the cooling of the refrigerator, continued to move upward, it would also move the double contact upward until it engaged the heater switch armature, thus stopping defrost action and recycling the sensing member. During the period between engagement of the bimetal with bimetal 28 and actuation of the termination bimetal, bimetal 30 will have a tendency to move further outward. This tendency is so great that a certain amount of distortion will occur in the bimetal, causing premature actuation of the switches. The second bimetal 28 will oppose this tendency to move outward, preventing distortion of bimetal 30. It can be seen that with the above arrangement, defrost action will only be stopped when the ambient temperature of the refrigerator has reached the desired level, and the termination bimetal has moved to close the heater switch. This tendency for the control bimetal 30 to distort could also be compensated for by providing a number of stops in the housing around the periphery of the control bimetal to positively stop its outward motion.

Figure 3:
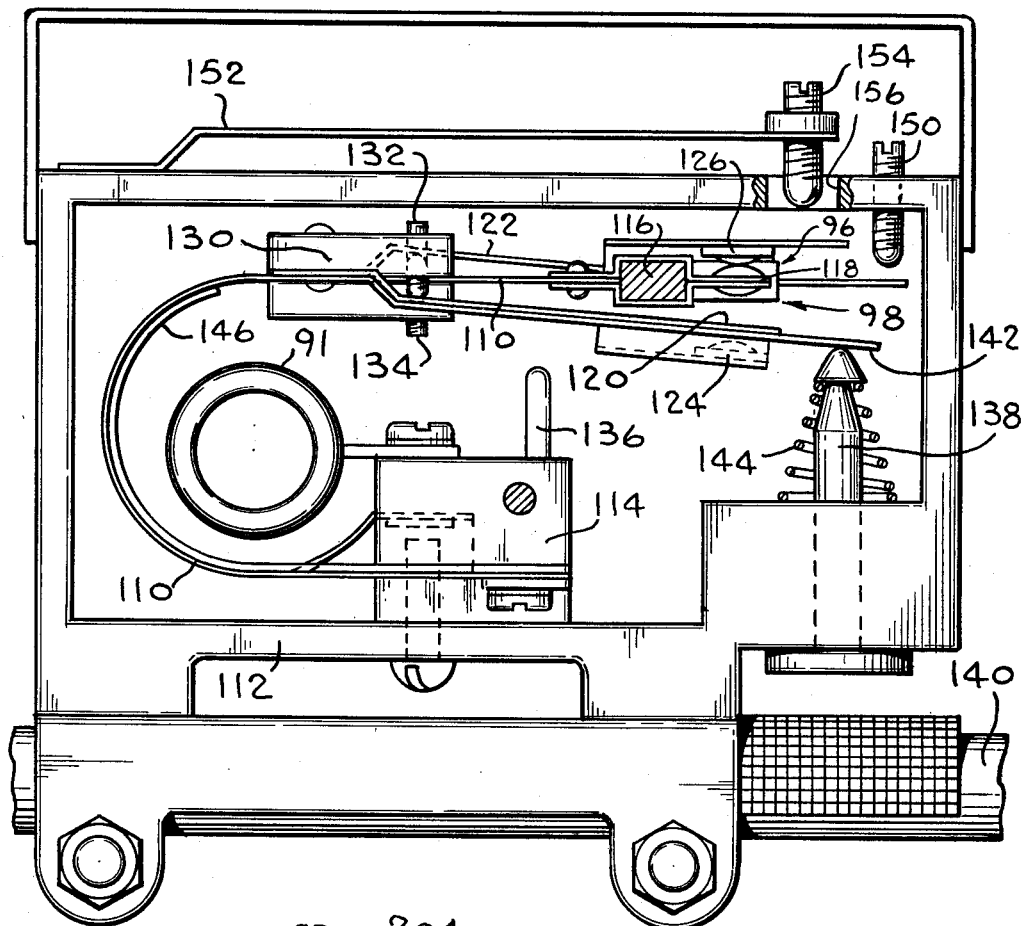
FIG. 3 is a side elevation of a modified defroster having a control bimetal wrapped around the inside of a spring.

In FIG. 3, a modified control is shown which is used in the circuit shown in FIG. 6. A refrigerator fan 102 is connected to switch 96 in the defrost control and solenoid actuated defrost device 100 is connected to switch 98 in the circuit. When compressor 92 is energized by closing compressor relay 94, the heater 91 of the defrost control will be energized and either switch 96 or 98, depending on whether the sensing member has engaged a predetermined accumulation of frost or not. If a defrost action is initiated, the fan will be turned off localizing the heat around the coils during the defrosting operation.

Defrost action will continue until the ambient rises sufficiently to melt the frost which has accumulated, at which time the defrost switch will be opened and the fan switch closed.

The defrost control used in this system has been modified to include a U-shaped spring 110, secured to housing 112 by support 114, which carries magnet 116 and double contact 118 on its free end. A pair of U-shaped springs 120, 122 are also secured to the housing by support 114 and to the spring 110 by bridge 130 and carry switch armatures 124, 126 respectively, which in combination with the double contact make up fan switch 96 and defrost switch 98. The switch armatures are biased outward from the double contact by screws 132, 134 so that the engagement of one armature with the magnet will release the other due to the division of the magnetic flux density as described above. This switch arrangement is similar to the sensor described above and functions basically in the same manner but operates on a different cycle. Spring 110 is biased downward towards stop 136 with springs 142 and 120 holding plunger 138 against coil 140. A flat spring 142 underlies spring 120 to provide sufficient stiffness to the spring 120 to overcome the bias of spring 144 on the plunger.

The stop 136 limits the downward position of spring 110 with double contact 118 disengaged from frost switch armature 124 when there is no frost on the coil. Control bimetal 146 is secured to the housing by support 114 and is wrapped around the inside surface of spring 110. Heater 91 is mounted on support 114 inside of the bimetal to heat the bimetal so that it moves the spring 110 outward from the heater. The heater is designed to provide only sufficient heat to move the end of the spring into engagement with stop 150. By limiting the heat given off by the heater, the bimetal will also be limited in its outward movement and will not cause premature operation of the switches. When the heater is deenergized, the bimetal will warp downwardly with spring 110 biased to follow the motion of the bimetal, pushing the plunger into engagement with the coil. Since the bimetal is not connected to the spring 110, it can warp inward without affecting the position spring on the stop 136. The normal position of switch 96 is closed, remaining that way throughout the cycle. When the compresser is de-energized, the spring will move toward the coil.

If the plunger engages a predetermined amount of frost on the coil, it will prevent further downward motion of the defrost switch armature. The double contact will move into engagement with the defrost armature and the fan switch armature will snap open due to the division of the flux density of magnet 116 and the bias of spring 120. The spring will remain in the lower position until the heater is energized. There will be no defrost action during this period since the compressor relay 94 must be open before a sensing motion is made by the plunger. On closing of the relay, the heater will be energized and the bimetal will warp upward, pushing spring 110 upward into engagement with stop 150. Since the upward motion of spring 110 is stopped, the double contact cannot close with the fan switch armature, since it is biased upward against the top of the housing by spring 122. Termination bimetal 152 is mounted on the top of the housing and on the refrigerator ambient reaching the desired level, it will move downward, moving pin 154 through aperture 156 in the top of the housing into engagement with spring 122, pushing the fan switch armature into engagement with the double contact. The defrost switch will snap open due to the reduction of magnetic flux density and the bias of spring 120, stopping defrost action.

Referring to the circuit shown in FIG. 6, it will be seen that the bimetal heater is connected in parallel with the compressor so that it will be de-energized when the compressor relay is open and the plunger will move to a sensing position. Since there will be no freezing or defrosting when the relay is open, there will be no tendency for frost or moisture to accumulate on the plunger. When the compressor relay is closed, the bimetal will move the spring 110, and consequently, the plunger away from the coil during the operation of the compressor for either refrigerating or defrosting operations. This also prevents the accumulation of frost on the plunger during the refrigerating cycle or the accumulation of moisture on the plunger during a defrost cycle because the sensing member is disengaged from the coil. The fan switch 96 will normally be closed when the compressor relay is closed, actuating the refrigerating fan with the compressor. As described above, the defrost switch will be closed and the fan switch opened when the plunger engages a predetermined amount of frost on the coil. When the compressor relay is closed, the solenoid actuated defrost device 100 will be energized causing the compressor to supply hot gas to the coils. As the ambient temperature rises, termination bimetal 152 will move downward closing the fan switch 96 which opens the defrost switch 98 and the system is operated on a refrigeration cycle.

This particular arrangement provides a number of advantages, one of which is that the sensing member will be moved out of conteact with the coil during both refrigerating and defrosting operations, thereby preventing any frost or moisture from forming on the sensing plunger when it moves away from the coil. It also provides control of the refrigerator fan so that it is turned off during defrost action to minimize the circulation of air around the coils and achieve rapid defrosting with minimum temperature rise in the space. Upon termination of defrost action, the fan circuit will be immediately closed by the termination bimetal starting up the operation of the fan simultaneously with the start of the refrigeraing cycle. The operation of the fan may be delayed after a defrost action to allow the refrigerator coils to "cool off," otherwise the warm air surrouding the coils will be circulated throughout the box. This may be accomplished in a number of ways one of which, as shown in copending application Serial No. 1,316, filed January 8, 1960, is to control the return motion of the fan switch by a bimetal which is responsive to the refrigerator ambient. This delay will allow the coils to refrigerate or remove most of the exces heat in the coils themselves and from the immediate vicinity surrounding the coils before recirculation of air begins.

Figure 1:
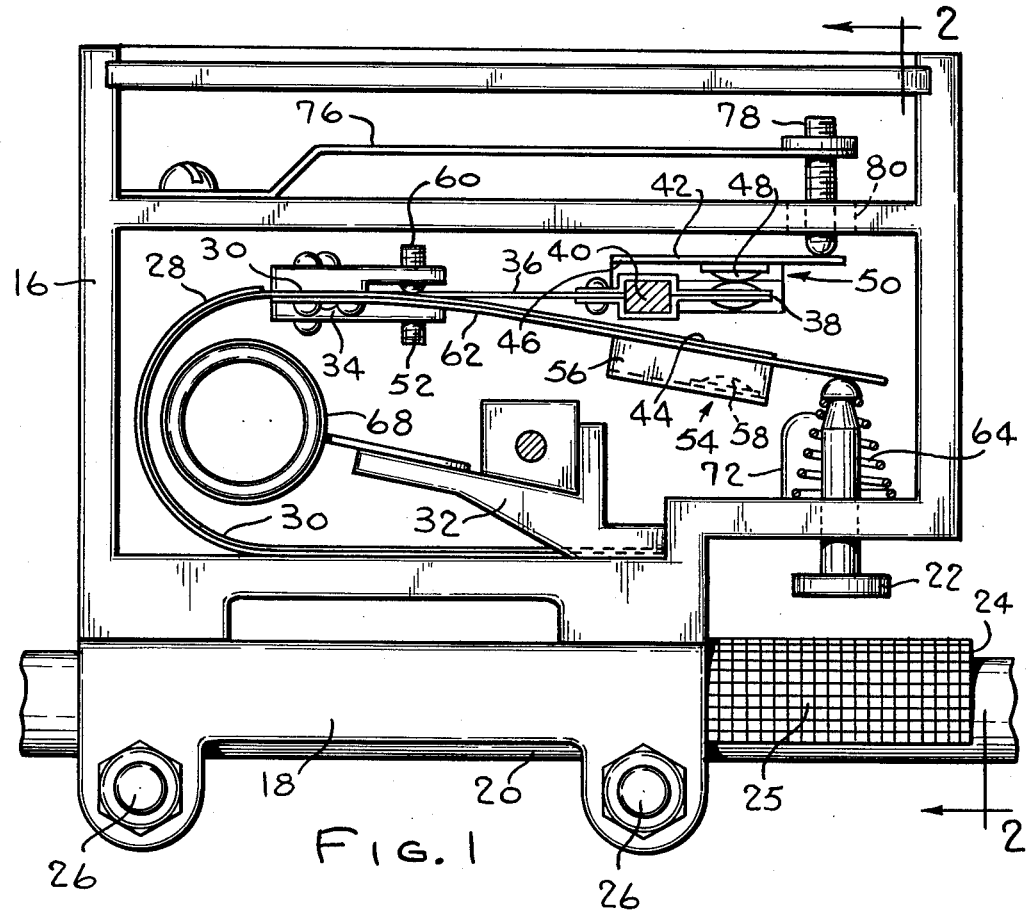
FIG. 1 is a side elevation of the defrost control showing the compensating bimetal wrapped around the control bimetal.
Figure 4:
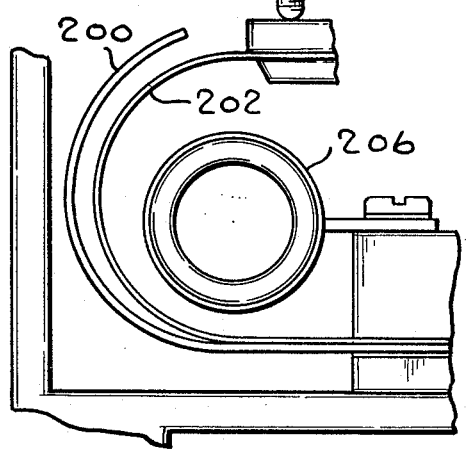
FIG. 4 is similar to FIG. 3 showing the bimetal positioned outside of the spring.

The modification in FIG. 4 shows a bimetal 200 wrapped around the outside of a spring 202. This arrangement could be used in the self-cycling arrangement shown in FIGS. 1 and 2 with the spring carrying a defroster switch and a heater switch and being biased upward against adjustable stop 204. When the bimetal is energized by heater 206, the spring will be moved downward making a sensing motion. The heater switch and defroster switch will be actuated in the same manner as described above. Since the heater is de-energized at the end of a sensing motion, there will be no tendency for the bimetal to cause the spring to overtravel. On the return motion, the spring will engage stop 204, preventing further upward movement and the bimetal will be free to move without disturbing the upper position of the spring. It is apparent that this arrangement could be used in the circuit shown in FIG. 6 if a double throw compressor relay switch were used to energize the heater when the compressor is turned off.

Although but a few embodiments of the present invention have been illustrated and described, it will be apparent to those skilled in the art that various changes and modifications may be made therein without departing from the spirit of the invention or from the scope of the appended claims.

I claim:

1. A defrost control for a refrigerating system comprising, a sensing member to indicate the presence of frost on the refrigerating system, actuating means operatively engaging the sensing member, a bimetal positioned to control the motion of the actuating means, a heater for energizing the bimetal so that the sensing member is reciprocally moved by the bimetal and the actuating means, switch means actuated by the movement of the actuating means to energize and de-energize the heater, and means for initiating defrost action when the sensing member engages a predetermined thickness of frost.

2. A defrost control according to claim 1 in which the actuating means comprises a spring, and the bimetal controls the sensing motion of the sensing member.

3. A defrost control according to claim 1 wherein the actuating means comprises a spring, and the bimetal controls the return motion of the sensing member.

4. A defrost control for refrigeration system comprising, a sensing member to indicate the presence of frost on an evaporator, bimetal means operatively engaging the sensing member, a heater for actuating the bimetal to reciprocally move the sensing member, switch means actuated by the movement of the bimetal to energize and de-energize the heater, compensating means to limit the motion of the bimetal when the heater is de-energized, and means for initiating defrost action when the sensing member engages a predetermined thickness of frost on the evaporator.

5. A defrost control for a refrigerating system comprising, a first bimetal movable through a predetermined path, a heater to heat the bimetal to move through the path, switch means actuated by the bimetal at each end of the path to control energization of the heater, a second bimetal operatively engaging the first bimetal to limit the motion of the first bimetal when the heater is de-energized, sensing means operatively connected to the first bimetal, and movable therewith to sense the presence of frost on an evaporator, and means actuated by the first bimetal for initiating defrost action when the sensing means engages a predetermined accumulation of frost.

6. The combination with a refrigeration system having a compressor, a refrigerator fan and a defrosting device connected in a common circuit, of means for controlling the operation of the fan and defrosting device in accordance with frost conditions on a portion of the refrigerating system comprising, sensing means positioned to engage a portion of the refrigerating system, spring means operatively positioned to bias the sensing means into engagement with the refrigerating system, bimetal means operatively engaging the spring means, said spring means being biased to follow the motion of the bimetal, means connected in the circuit or heating the bimetal when the compressor is energized to move the bimetal through a prescribed path, said sensing member being moved away from the refrigerating system when the bimetal is energized and moving into engagement with the refrigerating system when the switch compressor is de-energized, and switch means carried by the spring means for actuating the defrosting device when a predetermined accumulation of frost is sensed on the refrigerating system.

7. The combination of a refrigerating system and a defrost control comprising, a compressor, an electric circuit for the compressor, a fan in a parallel circuit to the compressor, an electrically energized defrost device connected in an electric circuit parallel with the electric circuit of the compressor for reversing the flow in the refrigerating system, switch means for energizing either the fan or the defrost device, sensing means mounted for motion towards and from the system evaporator for sensing frost on the evaporator, motor means controlling motion of the sensing means, said sensing means controlling the operation of the switch means, means rendering the motor means inoperative to move said sensing means towards said system evaporator during operation of said compressor, and means responding to ambient temperature to terminate the defrost action.

8. A defrost control for a refrigerating system comprising, a frost accumulating surface, a housing mounted adjacent the surface, a sensor mounted in the housing and movable into engagement with the surface, a spring having one end secured to the housing and the other end operatively engaging the sensor, a bimetal engageable with the spring, said spring being biased to follow the motion of the bimetal, a bimetal heater mounted within the housing to heat the bimetal so that the bimetal moves the spring and sensor, means for intermittently energizing the heater to cycle the spring and sensor toward and away from the surface, means for interrupting the motion of the spring toward the surface when the sensor engages a predetermined amount of frost on the surface, said interrupting means including means for initiating defrost action within the refrigerating system.

9. A defrost control for a refrigerating system according to claim 8 wherein the bimetal is positioned to move the spring and sensor into engagement with the frost accumulating surface and the spring is biased to follow the motion of the bimetal away from the surface.

10. A defrost control for a refrigerating system according to claim 9 wherein the bimetal is positioned to move the spring and sensor away from the frost accumulating surface and the spring is biased to follow the bimetal toward the first accumulating surface.

11. A defrost control according to claim 9 including means for disengaging the bimetal from the spring either when the sensor has been moved toward or away from the surface.

12. A defrost control for a refrigerating system including a compressor electrically connected to a defrosting device and a refrigeration fan comprising a housing, bimetal means secured to the housing, a bimetal heater mounted within the housing, means for energizing the heater to move the bimetal means through a prescribed path when the compressor is energized, sensing means actuated by the motion of the bimetal to sense accumulations of frost on the system evaporator, fan switch means and defroster switch means actuated by the motion of the bimetal, said fan switch being normally closed when the compressor is energized, and said defrost switch being closed when the sensing means senses a predetermined accumulation of frost, so that defrost action is initiated when the compressor is energized, and means for simultaneously opening the fan switch when the defrost switch is closed.

13. A defrost control for a refrigerating system comprising, a sensing means movable between a sensing position and a retracted position, a first bimetal controlling motion of the sensing means, a heater for the bimetal to warp the bimetal for moving the sensing means from one position to the other and a second bimetal preventing movement of the first beyond one of its positions, and means rendering the sensing means responsive to the motion of said first bimetal between said sensing and retracted positions of said sensing means and rendering said sensing means non-responsive to the motion of said first bimetal after said sensing means has reached a sensing position.

14. The combination of a refrigerating system and a defrost control comprising, a compressor, an electric circuit for the compressor, a fan in a parallel circuit to the compressor, an electrically energized defrost device connected in an electric circuit parallel with the electric circuit of the compressor for reversing the flow in the refrigerating system, switch means for energizing either the fan or the defrost device, sensing means mounted for motion towards and from the system evaporator for sensing frost on the evaporator, motor means controlling motion of the sensing means, said sensing means controlling the operation of the switch means, said motor means including a spring biased in a sensing direction and a bimetal positioned to move the spring away from the refrigerating system when heated.

15. The combination of a refrigerating system and a defrost control comprising, a compressor, an electric circuit for the compressor, a fan in a parallel circuit to the compressor, an electrically energized defrost device connected in an electric circuit parallel with the electric circuit of the compressor for reversing the flow in the refrigerating system, switch means for energizing either the fan or the defrost device, sensing means mounted for motion towards and from the system evaporator for sensing frost on the evaporator, motor means controlling motion of the sensing means, said sensing means controlling the operation of the switch means, said motor means including a first bimetal normally holding the sensing means in engagement with the evaporator system and a second bimetal positioned to oppose the movement of the first bimetal when the sensing means is disengaged from the system evaporator.

16. A defrost control for a refrigerating system comprising, sensing means movable between a sensing position and a retracted position, a bimetal controlling the motion of the sensing means, a heater for the bimetal to warp the bimetal from one position to the other, means rendering the sensing means responsive to the bimetal between the sensing and retracted positions of said sensing means and rendering said sensing means non-responsive to the motion of said bimetal after said sensing means has reached one of said positions, a spring biasing the sensing means toward one of said positions, and said bimetal being positioned to move said spring from one position to the other.

References Cited in the file of this patent
UNITED STATES PATENTS

| | | |
|---|---|---|
| 2,123,073 | Bell | July 5, 1938 |
| 2,231,653 | Baxter | Feb. 11, 1941 |
| 2,421,819 | Vendenburg | June 10, 1947 |
| 2,520,906 | Cade | Sept. 5, 1950 |
| 2,662,380 | Sutton | Dec. 15, 1953 |
| 2,692,930 | Dillman | Oct. 26, 1954 |
| 2,743,574 | McCorkle | May 1, 1955 |
| 2,808,707 | Chace | Oct. 8, 1957 |
| 2,987,595 | Nelson | June 8, 1961 |

FOREIGN PATENTS

| | | |
|---|---|---|
| 258,303 | Great Britain | Sept. 23, 1926 |

UNITED STATES PATENT OFFICE
CERTIFICATE OF CORRECTION

Patent No. 3,134,238 May 26, 1964

Alan Arthur Matthies

It is hereby certified that error appears in the above numbered patent requiring correction and that the said Letters Patent should read as corrected below.

Column 7, line 14, for "refrigeration" read -- refrigerating --; line 48, for "or heating" read -- for heating --; column 8, lines 20 and 24, for the claim reference numeral "9", each occurrence, read -- 8 --.

Signed and sealed this 29th day of September 1964.

(SEAL)
Attest:

ERNEST W. SWIDER
Attesting Officer

EDWARD J. BRENNER
Commissioner of Patents